Dec. 6, 1960
R. HOLMES
2,962,951
AUTOMOBILE AIR CONDITIONING SYSTEM
FOR DRIVE-IN THEATERS
Filed June 16, 1954
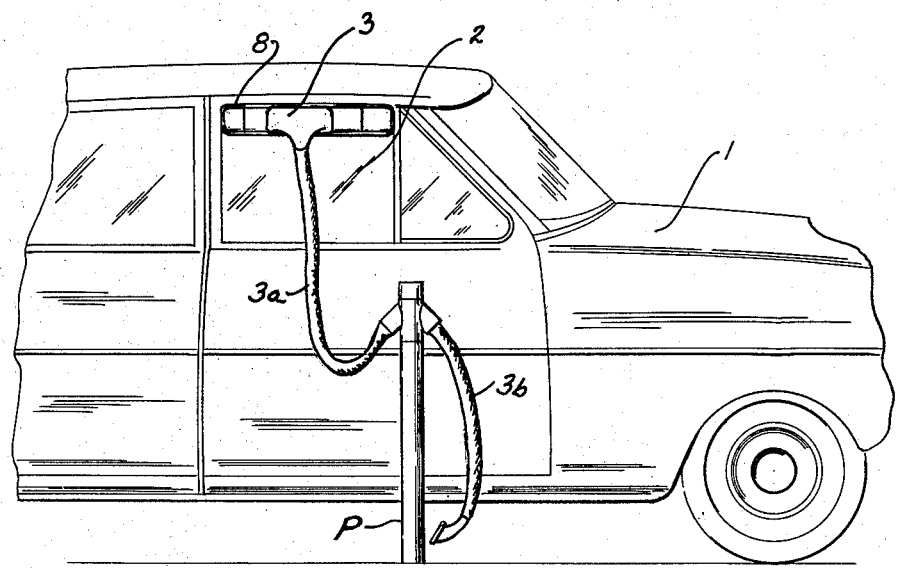
FIG 1
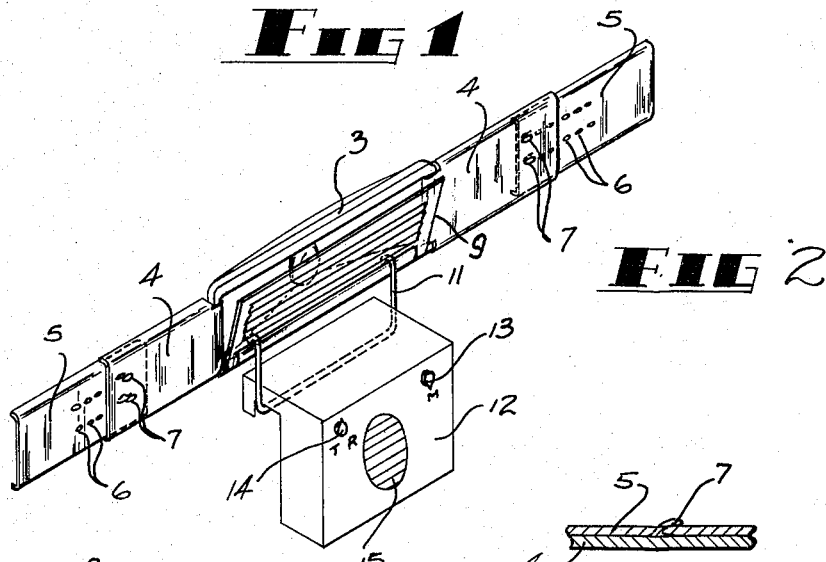
FIG 2
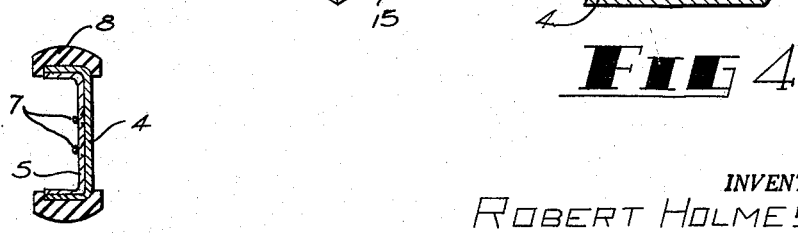
FIG 3
FIG 4
INVENTOR.
ROBERT HOLMES
BY
*William J. Ruano*
ATTORNEY

United States Patent Office 2,962,951
Patented Dec. 6, 1960

2,962,951

AUTOMOBILE AIR CONDITIONING SYSTEM FOR DRIVE-IN THEATERS

Robert Holmes, 2230 5th Ave., Pittsburgh, Pa.

Filed June 16, 1954, Ser. No. 437,075

1 Claim. (Cl. 98—2)

This invention relates to an air conditioning system for authomobiles when parked in outdoor drive-in theaters.

Attempts have been made in the past to heat automobiles, when parked in drive-in theaters, by external sources of heat. However, such systems have not been successful nor adopted commercially because of certain outstanding disadvantages, such as the lack of an airtigh seal between the hose or nozzle introducing air into the automobile, also because such systems are not readily adaptable to existing drive-in systems.

An object of my invention is to provide a novel air conditioning system for automobiles, when parked in drive-in theaters, which system is devoid of the above-named disadvantages and which is readily applicable to existing drive-in automobile air conditioning systems.

A more specific object of my invention is to provide a system for selectively heating or cooling an automobile from an external, central air conditioning unit, and for easily and quickly forming an air-tight connection above the window of the automobile to prevent escape of conditioned air.

Another object of my invention is to provide a readily attachable nozzle unit for air conditioning an automobile from an external source, which unit is adapted to support a conventional, portable loudspeaker, commonly used in drive-in theaters.

Other objects and advantages of my invention will become apparent form a study of the following description taken with the accompanying drawing wherein:

Figure 1 is a side view showing a fragmentary part of an automobile having mounted on the window thereof a readily attachable air conditioning outlet embodying the principles of my invention;

Figure 2 is an enlarged perspective view of the air conditioning outlet and extensible sealing elements (with the peripheral sealing gasket removed) for providing an air-tight connection, and including a support for conventionally used loudspeakers;

Figure 3 is an enlarged transverse cross sectional view of the extensible elements showin Figure 2 with the addition of gasket 8 and;

Figure 4, is an enlarged transverse cross sectional view through portions of the extensible elements and more clearly showing the means for holding the elements in an adjusted position.

Referring more particularly to the drawing, numeral 1 denotes an automobile having a side window 2 of conventional construction, which may be raised or lowered by turning of a crank (not shown). Mounted on the top of window 2 is an air outlet or nozzle 3 connected to a flexible hose 3a which, in turn, is connected to a hollow vertical post P. Other hoses such as 3b may be supplied by the same post. The post in turn, together with other similar posts distributed throughout the drive-in theater, is connected to a central heating and cooling system (not shown) which may be located in a dwelling or refreshment stand generally provided in drive-in theaters. Such central unit may be of any conventional types for the purpose of selectively providing heated air for use on cold days or refrigerated air for use on hot days.

A more important feature of the present invention resides in the particular mounting of the outlet nozzle so as to provide an air-tight connection at the top of the window 2. Attached to the side of the air outlet or nozzle 3 are channel-shaped stationary plates 4, of metal or other suitable material, having slidably fitted therein similar extensible elements or plates 5, so that by pulling out plates 5 sufficiently, the entire gap extending from the sides of nozzle 3 to the window frame may be closed so as to prevent entry or escape of air. Punched out of plates 4 are protuberances or projections 7, as shown more clearly in Figures 3 and 4, which are adapted to be selectively connected to different holes 6 in slidable plates 5. Elements 4 and 5 are somewhat loosely fitted so as to allow free sliding movement and riding of projections 7 along the inner surfaces of elements 5 when the latter elements are extended.

In order to provide an air-tight connection with the top of the window and windowframe a gasket 8 of rubber or other extensible material is provided, having a grooved inner surface to closely fit the outer flanges of elements 4 and 5. Elements 8 may, if desired, be constructed like garters to provide greater flexibility so as to completely surround the perimeter of outlet or nozzle 3 and elements 4 and 5 in the combination shown in Figure 2 and thus provide an air-tight joint with the doorframe and top of the window of the car. Since different cars have different width windows it is necessary to provide extensible elements having selectively adjustable overall width.

Pivotally mounted on the outlet or nozzle 3, is a door 9 which may be grilled, as shown, and in which the grills or louvers may be adjustably opened and closed, if desired, to enable either complete or partial shut off of conditioned air or selective angular deflection thereof.

Mounted on the bottom of outlet nozzle 3 is a hanger 11 preferably of wire for supporting a hook-shaped top part of a conventional loudspeaker 12 generally used in drive-in theaters for mounting in individual automobiles. Switch 13 is provided for making an electrical connection to use speaker 12 as a receiver for sound from the drive-in movies. There is also provided a two-position switch 14 ("transmit" and "receive") for allowing speaker 12 to be used either as a transmitter or receiver for intercommunication with the refreshment stand or booth of the drive-in theater to enable patrons to phone in orders for refreshments. Instead of mounting speaker unit 15 as shown, it may be mounted directly inside of outlet 3. However, since drive-in theaters already have speakers, a better ararngement is to provide a unit as shown in Figure 2 for supporting such speaker. Instead of supporting the speaker 12, a tray supporting element having a hooked-shaped bracket, similar to that shown in Figure 2 for the speaker, may be similarly supported from hanger 11 so that trays of refreshments may be conveniently supported thereon.

Thus it will be seen that I have provided an efficient air conditioning system for cooling automobiles in the summer and heating them in winter, when parked in drive-in theaters, so as to enable increasing the season that such drive-in theaters can be used in comfort by occupants of automobiles; also I have provided in a hose outlet a sealing means which is readily extensible so as to completely fill the gap between the window and windowframe in the door of an automobile in an air-tight manner; furthermore I have provided a simple and convenient support for conventional portable loudspeakers such as found in drive-in theaters and for similar items.

While I have illustrated and described an embodiment of my invention, it will be understood that this is by way of illustration only, and that various changes and modifications may be made within the contemplation of my invention and within the scope of the following claim.

I claim:

In a drive-in theater, a plurality of hollow vertical posts emerging vertically upwardly from the supporting ground surface, a central air conditioning unit connected to said posts for selectively supplying heated or cooled air thereto, a plurality of flexible hoses connected to the top end portion of each of said posts, an outlet nozzle connected to the free end of each of said hoses for mounting in an opening above a car window, said nozzle comprising an elongated housing having an air inlet opening at the bottom thereof connected to said free end of said hose and having an open front outlet for discharging air into a car, a louvered door pivotally mounted on said open front outlet for varying the amount of air discharged therethrough, relatively longitudinally slidable panels attached to at least one side of said housing for adjusting the housing to fit the overall width of said car window opening, one of said panels including a flange for longitudinally guiding the other and a flexible gasket of elastic material in the form of an endless loop surrounding the perimetrical top, bottom and free edges of said relatively slidable panels and to at least the top and bottom edges of said housing and being sufficiently extensible so as to permit relative sliding movement of said panels to insure an air-tight seal between said housing and panels and the top of the car window and the sides and top of the car window frame, and means for holding said panels in the extended position.

References Cited in the file of this patent

UNITED STATES PATENTS

| | | |
|---|---|---|
| 1,750,789 | Thompson | Mar. 18, 1930 |
| 1,752,372 | Bothezat | Apr. 1, 1930 |
| 1,838,207 | Allen | Dec. 29, 1931 |
| 2,091,594 | Innes | Aug. 31, 1937 |
| 2,469,986 | Phyfe | May 10, 1949 |
| 2,612,830 | Kendrick | Oct. 7, 1952 |
| 2,614,478 | Herman | Oct. 21, 1952 |
| 2,658,439 | Royal | Nov. 10, 1953 |
| 2,660,943 | Dion et al. | Dec. 1, 1953 |